June 2, 1931.  J. R. BARNHART  1,808,013
TUBE TESTER
Filed Jan. 7, 1930    3 Sheets-Sheet 1

INVENTOR.
J. R. BARNHART
BY
Hull Brock + West
ATTORNEYS.

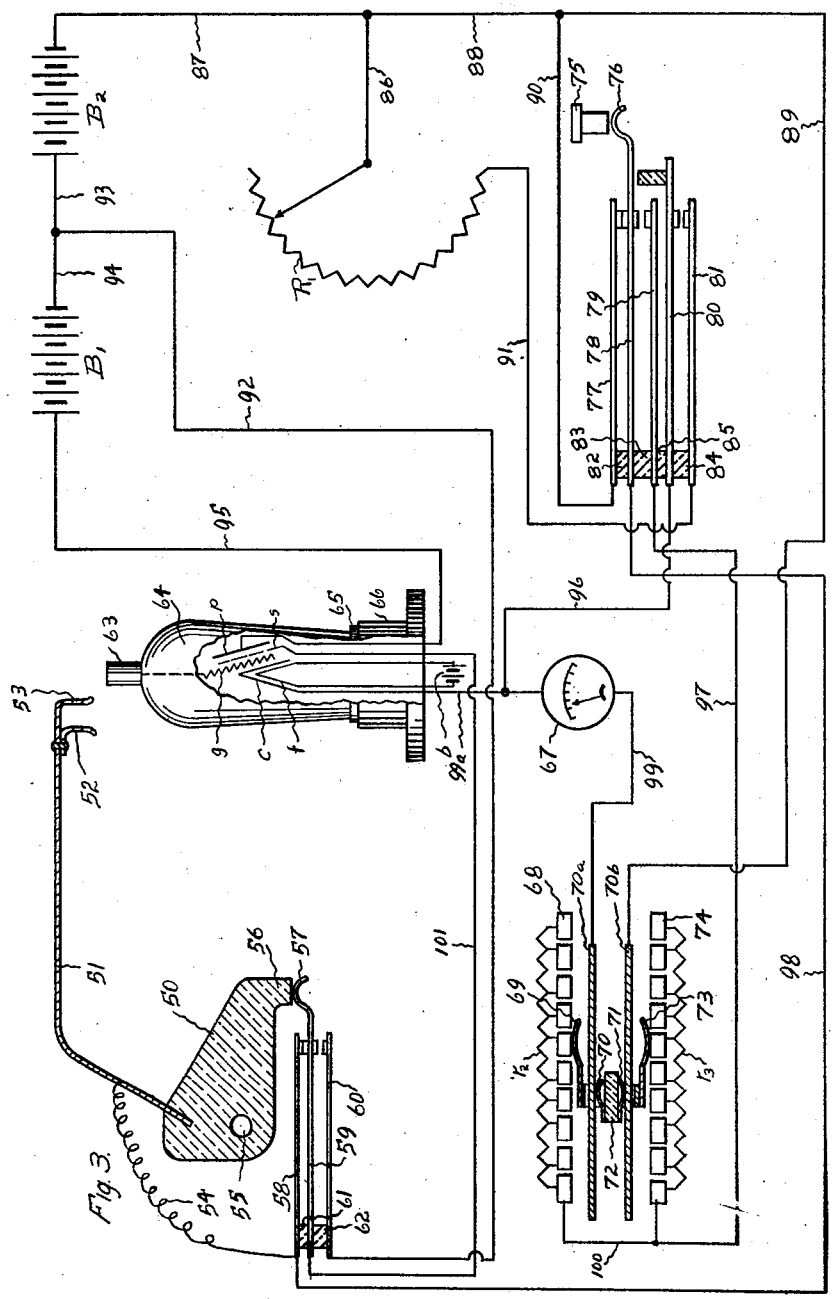

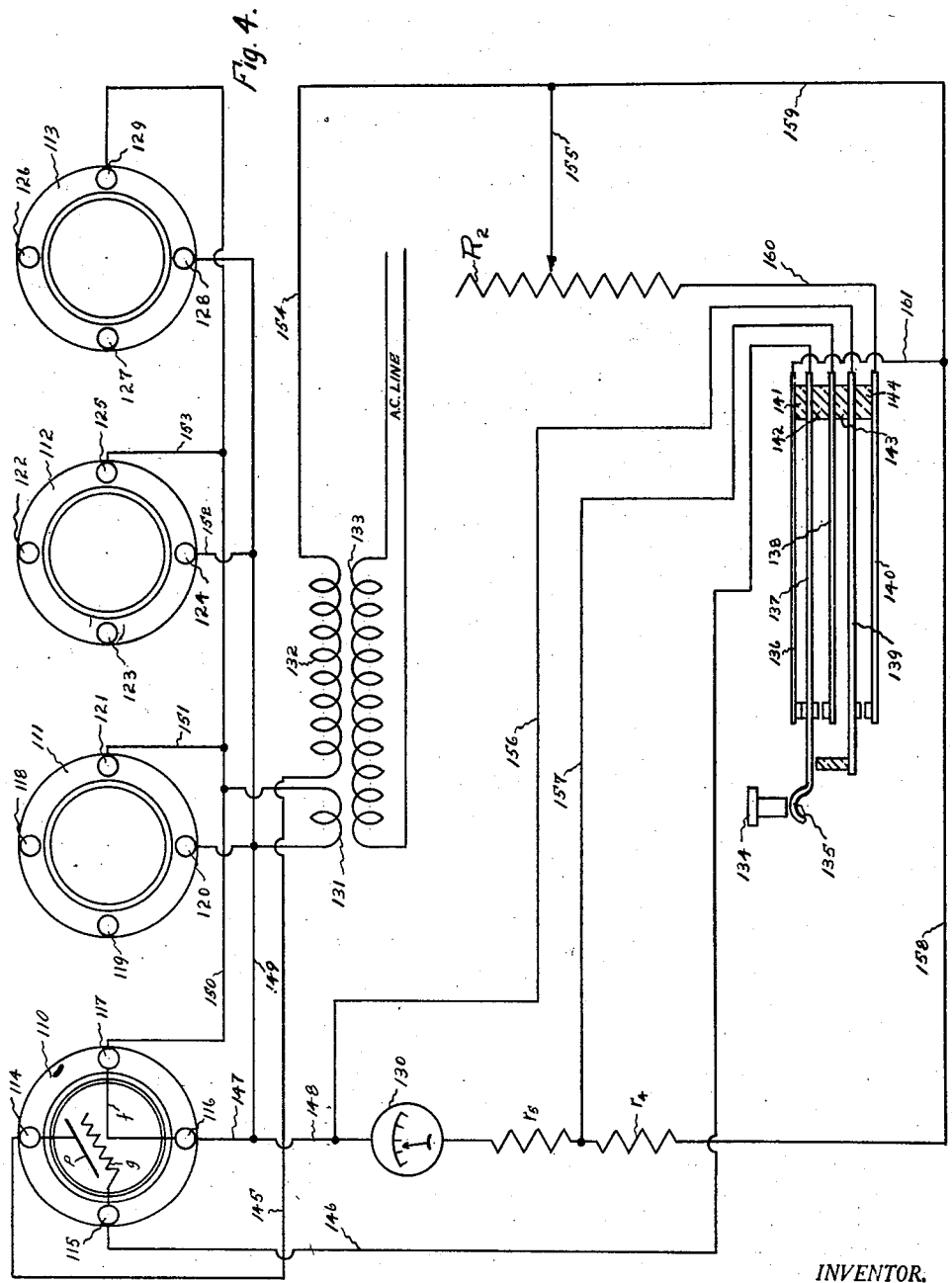

Patented June 2, 1931

1,808,013

UNITED STATES PATENT OFFICE

JOB R. BARNHART, OF LAKEWOOD, OHIO, ASSIGNOR TO WALTER M. SCOTT, OF LAKEWOOD, OHIO, AND RALEIGH E. TRESISE, OF CLEVELAND HEIGHTS, OHIO

TUBE TESTER

Application filed January 7, 1930. Serial No. 419,031.

This invention relates to a device for measuring the mutual conductance of radio tubes and includes mechanism which adapts it for making such measurement either on the ordinary tubes having unshielded grids or on screen grid tubes having the control grid contact at the top. The tube tested may be of the heater type having five base contacts and in which is employed a cathode not electrically connected to the heating filament.

It is well known that the mutual conductance of a tube, that is, the ratio of change in plate current to change in grid potential producing same, is one of the best measures of the practical qualities of a tube. The mutual conductance of a tube however is not constant for all operating conditions, accordingly it is necessary to make such measurements under the normal operating conditions of the tube in order that the test may be of practical value. In the case of ordinary tubes, it is essential that the plate potential, filament current and grid potential should approximate those which will be employed when the tube is in service. In the case of screen grid tubes there must be in addition a potential impressed upon the shielding grid which will be employed when the tube is in service. Accordingly it is the principal object of my invention to provide a device in which the tube will be tested under conditions closely approximating those in the set in which it is to be used and at the same time provide improved means for making the necessary measurements for determining mutual conductance under those conditions.

A further object of my invention is to provide a new and improved means for making measurements from which mutual conductance may be calculated.

A further object is to provide a means for making such measurement a simple and convenient process.

A further object is to provide means for quickly and conveniently changing the connections from those required for an unshielded tube to those required for a screen grid tube and whereby it will not be possible to make connections for the wrong type of tube which would result in damage to the tube. A further object is to provide a novel grid biasing connection which includes a portion of the measuring mechanism.

Other and more specific objects will appear from the following description.

Figure 1:
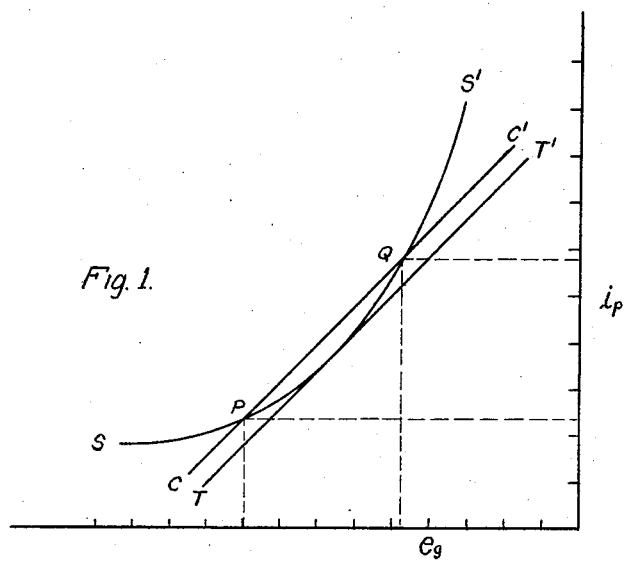
Figure 2:
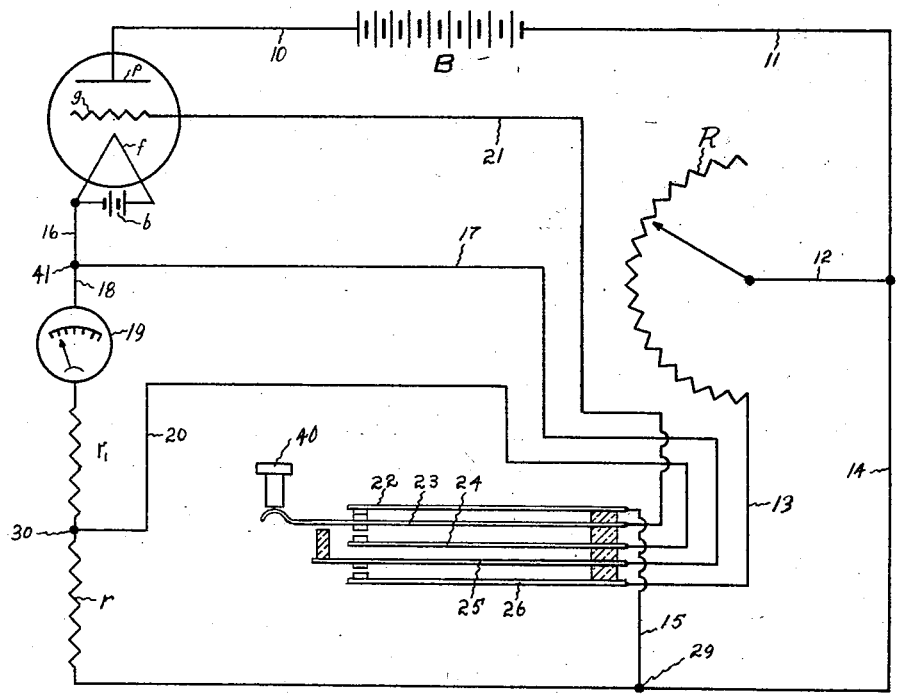

Referring to the drawings forming a part of this specification, Fig. 1 is a graphic representation showing the characteristics of a typical radio tube and the fundamental theory involved in my improved measuring device; Fig. 2 is a schematic diagram illustrating my measuring device; Fig. 3 is a schematic diagram of a modified form adapted for use in connection with screen grid tubes and unshielded tubes; Fig. 4 is a schematic diagram of a modified form adapted for alternating current energization.

Referring to Fig. 1, the curve S S' may represent the characteristics of a typical radio tube, where ordinate distances represent plate currents and abscissa distances represent grid potentials. It will be evident that the first derivative of the curve S S' or the slope of a tangent T T' to the curve is the mutual conductance, defined as $$\frac{\delta i_p}{\delta e_g},$$

of the tube at the particular plate current and grid potential represented by the point of tangency. Since it is not possible to determine the tangent T T' of the curve S S'' at a single point, it is necessary to make determinations at points P Q separated by an appreciable distance and take the slope of the chord C C' as an approximation of the slope of the tangent T T'. The variation of the slope of the chord from that of the tangent will be so small as to be negligible. Since in the use of a tube the values of plate current and grid potential vary, the approximate method will be more true to actual operating conditions than an exact method would be if one were available.

In Fig. 2 I have shown diagrammatically a radio tube having a plate $p$, a grid $g$ and a filament $f$. A battery $b$ or other suitable current is impressed across the filament $f$ for rendering the same incandescent, and a battery B has its positive terminal connected to the plate $p$ by a conductor 10 and its negative terminal connected through conductors 11 and 14 to the resistor $r$ which is in turn connected through resistor $r_1$ and the milliammeter 19 to conductor 18 which is connected through the conductor 16 to the filament $f$ thus completing the output or plate circuit. The control grid $g$ is connected through conductor 21, switch point 23, switch point 22, and conductor 15 to the point 29 which is at the potential of the negative terminal of the battery B. In the other position of the switch controlled by the push button 40, the grid $g$ is connected through conductor 21, switch point 23, switch point 24 and conductor 20 to the point 30 which is at a potential less negative than that of the point 29 by an amount equal to the product of the plate current times the resistance of the resistor $r$. When the push button 40 is depressed the grid $g$ is connected to the point 30 and a variable resistor R is shunted across the ammeter 19 and resistors $r$ and $r_1$ to the point 29 whereby at the same time the grid potential is changed a shunt circuit is provided from the point 41 to the point 29.

Operation

Starting with switch S in position shown, current will flow through filament $f$ which is connected across battery $b$. Electrons will be emitted from $f$ and flow across to grid $g$ and plate $p$ and a plate current will flow in the opposite direction, the circuit being made through conductor 10, battery B, conductor 11, conductor 14, resistor $r$, resistor $r_1$, ammeter 19, and conductor 16 to $f$. Since the plate current of a tube is always affected by the grid potential, which will be that of the point 29 and the same as that of the negative terminal of the battery B the strength of this current is affected by the resistors $r$ and $r_1$ in the grid circuit which is made through conductor 21 switch contacts 22 and 23, conductor 15, resistors $r$ and $r_1$, ammeter 19, and conductors 18 and 16 to $f$. (The drop of potential in conductors is negligible and is considered to be zero for the purposes of this specification.)

If now the push button 40 of the switch S be depressed, the grid circuit will be made through conductor 21, switch points 23 and 24, conductor 20, resistor $r_1$, ammeter 19 and conductors 18 and 16 to $f$. The grid potential will now be that of the point 30 which is higher than that of the point 29 by a value equal to the plate current times the resistance of the resistor $r$. It is evident that the change in grid potential will produce a change in plate current which could be read off directly on the ammeter 19 if the switch contacts 25 and 26 were not closed at the same time. However, these contacts will be closed by depression of the push button 40 and thereby a resistor R will be shunted across the points 29 and 41, through conductor 17, switch contacts 25 and 26, conductor 13, resistor R, and conductor 12. The current will divide through the two parallel paths according to the laws of parallel resistances and the increase in plate current which could have been read off from the ammeter 19 if resistor R had not been inserted will be reduced by the value of curent flowing through R. Since R is a variable resistor, it is obvious that its value may be changed so as to cause the ammeter to read exactly the same value whether the switch S is in one position or the other. Of course, the resistors must be properly chosen and the ammeter must have a suitable range.

In practice I read the ammeter 19 while the switch is in the position shown, then adjust the resistor R so that the pointer of the ammeter shows no change in the two positions of the switch S. I provide the resistor R with a dial suitably calibrated to read mutual conductance directly.

The calculations for the calibration of the resistor R and proof thereof may be understood from the following:

Mutual conductance, $G_m$, is by definition the ratio of the change in plate current, $\Delta i_p$, to the change in grid potential, $\Delta e_g$, which produces it. The specific change herein referred to is that resulting from the changing of the position of the switch S. This may be written, representing an increment of change by $\Delta$, $\Delta e_g G_m = \Delta i_p$. If I represents the total plate current, $r$ and $r'$ the resistance of resistors $r$ and $r'$, E the drop of potential from point 29 to point 41 and R the resistance of the resistor R, then $rI = \Delta e_g$. And since $\Delta e_g G_m = \Delta i_p$, $rIG_m = \Delta i_p$. From Ohm's law, $E = (r+r_1)I$. Now after having adjusted the value of R so that the ammeter reads the same in both positions of the switch S, $E/R = \Delta i_p$, since $E/R$ is a measure of the current diverted through R which current is the increase due to the change in grid potential caused by changing the position of the switch S. Therefore, $$\frac{(r+r_1)I}{R} = \Delta i_p$$

Also, $rIG_m = \frac{(r+r_1)I}{R}$,

And, $G_m = \frac{(r+r_1)I}{RrI} = \frac{(r+r_1)}{r} \times \frac{1}{R}$

It follows from this that since I know the ratio $\frac{r+r_1}{r}$, I have but to assign to each chosen resistance value of R corresponding to a position marking on a suitable dial a value equal to the reciprocal of the resistance corresponding to that position multiplied by the ratio $$\frac{r+r_1}{r}.$$

Referring to the modification shown in Figs. 3, I have shown a socket 66 adapted to receive selectively tubes of the screen grid type or of the unshielded grid type provided only that the terminals of the tube are so positioned on the base as to fit the socket. Mounted on the same support as the tube 66 I provide a switch, indicated generally by the numeral 50, which is adapted to cooperate with said tube to adapt the circuits either for the screen grid tube or the unshielded tube. Since the mechanical relations of the tube 64 and the switch 50 are important, I have shown an elevation of the tube 64 in the socket 66 for illustration of the mechanical relations and have shown the essential elements of the tube schematically to disclose the electrical connections. The switch 50 comprises a pivoted arm, indicated specifically by the numeral 50, pivoted at 55 and provided with a downward extension 56, an arm 51 made of a strip of metal and provided with a pair of resilient contacting arms 52 and 53 adapted for cooperation with the contact 63 of the tube 64, a series of spring arms 58, 59 and 60, insulated from each other and the arm 59 having a portion 57 adapted to cooperate with the downwardly extending portion 56 of the arm 50. Insulating blocks 61 and 62 are provided for holding the spring arms 58, 59 and 60 separated from each other.

The screen grid tube illustrated consists of a tube portion 64 having a contact 63 to which is connected the control grid $g$. The plate $p$, the shielding grid $s$, the cathode $c$ and the filament $f$ are brought out through the bottom of the tube. I have shown a battery $b$ for heating the filament $f$. I have shown batteries $B_1$ and $B_2$ connected in series and having a tap 92 taken off from the conductor joining these batteries. The switch controlled by the push button 75 is identical with that controlled by button 40, already described in connection with Fig. 2 and comprises strips of spring metal 77 to 81, insulated from each other by insulating blocks 82 to 85. The resistors $r_2$ and $r_3$ which correspond to resistors $r$ and $r_1$ in Fig. 2 are provided with mechanism whereby they may be varied but must always remain of substantially constant ratio. This mechanism comprises bars $70_a$ and $70_b$ upon which slides a movable member which comprises spring arms 69 and 73 suitably mounted upon an insulating member 72, insulated from each other thereby, and being held frictionally in position by spring arms 70 and 71 which are electrically connected thereto and slide against the bars $70_a$ and $70_b$. The spring arms 69 and 73 slide against contact bars 68 and 74, each of these numerals representing the entire series of contact bars. It will be evident from the drawings that the value of resistors $r_2$ and $r_3$ will remain in constant ratio but may be varied.

The plate circuit comprises conductor 95 connected to the plate $p$ and to the positive terminal of the battery $B_1$, a conductor 94 connected to the negative of such battery and through conductor 93 to the positive terminal of battery $B_2$, the conductors 87, 88 and 89, the resistors $r_2$ and $r_3$, the conductor 99, and ammeter 67 and the conductor $99_a$ to the cathode $c$.

When the switch 50 is in the position shown the device is adapted for making measurements on an unshielded tube and when such tube is in the socket 66, which has the usual terminals shown only schematically, the conductor 101 which is shown connected to the shielding grid $s$ will be connected to the control grid of such unshielded tube and the control grid circuit will comprise the conductor 101, the switch arm 59, the switch arm 58, the conductor 98, the switch arm 78, the switch arm 77 and the conductor 90 when the switch controlled by the push button 75 is in the position shown. The control grid will thus be at the potential of the negative terminal of the battery $B_2$.

When the switch 50 is in the position shown and the push button 75 is depressed, the grid circuit will then be through the arm 79 instead of the arm 77 and through conductor 97 to the point of connection between the resistors $r_2$ and $r_3$, which point will be at a potential less negative than that of the negative terminal of the battery $B_2$ by an amount equal to the product of the plate current by the resistance of the resistor $r_3$. At the same time the control grid is connected to the conductor 100 instead of to the conductor 89, a resistor $R'$ will be shunted across the resistors $r_2$ and $r_3$ and the ammeter 67 by a circuit through the conductor 96 to the switch arms 80 and 81, the conductor 91, the resistor $R'$, and the conductor 86. These connections are those employed when an unshielded tube is tested.

When it is desired to test a screen grid tube such as is illustrated in the drawings, the switch arm 50 will be rotated about the pivot 55 by the spring arm 51 when the gripping fingers 52 and 53 are moved to engaging relation with the contact 63. Such rotation will depress the curved portion 57 of the switch arm 59 and change the connection of arm 59 from arm 58 to arm 60. The circuits will now be, when the switch controlled by the push button 75 is in the position shown, as follows: The plate circuit will run from plate $p$ through conductor 95, batteries $B_1$ and $B_2$, conductors 87, 88 and 89, resistors $r_3$ and $r_2$ and ammeter 67 to the cathode $c$. The control grid circuit will run through contact 63, spring arm 51, conductor 54 conductor 98 switch arm 78, switch arm 77 and conductor 90, thus connecting the control grid to the plate circuit at a point having a potential equal to that of the negative terminal of the battery $B_2$.

As before stated, it is necessary to approximate the operating conditions of the tube and to this end the shielding grid $s$ will be connected through conductor 101, switch arm 59, switch arm 60, and conductor 92 to a point between the batteries $B_1$ and $B_2$ thereby impressing upon said shielding grid a potential intermediate the potential of the plate and that of the negative terminal of the battery $B_2$. When the switch controlled by push button 75 is in the other position, the control grid will be connected through contact 63, spring arm 51, conductor 54, conductor 98, switch arm 78, switch arm 79, conductor 97, to the conductor 100 joining the resistances $r_2$ and $r_3$ thus impressing upon the control grid a potential less negative than that of the negative terminal of the battery $B_2$.

At the same time, the switch arms 80 and 81 will be brought into contact and a circuit will be made through conductor 86, resistor R', conductor 91, switch arm 81, switch arm 80 and conductor 96 to the cathode $c$, thereby shunting said resistance R' across the ammeter 67 and the resistors $r_2$ and $r_3$.

With the exception of refinements in the structure rendered necessary for measurement of both types of tubes, the functions of which are thought to be obvious, the modification of Fig. 3 operates in the same manner as that of Fig. 2 and it is thought unnecessary to elaborate further upon such operation.

While I have shown the socket 66 of the type adapted to accommodate five contact tubes it is to be understood that the same may be of the four contact type or I may employ one of the four contact type having the terminals thereof connected to corresponding terminals of the socket 66 (not shown) whereby tubes of four or five contacts may be measured in the device without making any changes in connections.

Referring to the showing of Fig. 4, sockets 111 to 113 are provided for the purpose of saving time in testing tubes which require an appreciable time for the heating filament to reach such a temperature that the electron-emitting surface of the tube will be at proper operating temperature. It will be seen that the socket 110 is provided for the purpose of carrying out tests according to the method disclosed in connection with Fig. 2, and that the circuits are essentially the same as disclosed in that modification, differing therefrom by the fact that the filament contacts 120, 121, 124, 125, 128 and 129 are connected in parallel with the contacts 116 and 117, and that an alternating current transformer having two separate secondary windings is substituted for the batteries $b$ and B. A larger or smaller number of preheating sockets may be employed according to the needs of the particular instrument.

In operation the tubes to be tested are placed in the sockets and a sufficient amount of time for the heating of the filament of the tube in socket 110 is allowed to elapse, then the milliammeter 130 is read and the resistor $R_2$ is set to such a point that the pointer of the ammeter shows no change in the two positions of the switch controlled by push button 134. When this condition is obtained, the mutual conductance of the tube is read off from a graduated dial associated with resistor $R_2$. While this test is being made, the tubes in the preheating sockets 111 to 113 will have been brought to the required condition and may be inserted in the socket 110 and tested immediately.

When the push button 134 is in the position shown, the plate circuit is made through conductor 145, winding 132, conductor 154, conductor 159, conductor 158, resistor $r_4$, resistor $r_5$, ammeter 130, conductor 148 and conductor 147 to the filament. The grid circuit will be made through conductor 146, switch contact 137, switch contact 136, and conductor 161 to the plate circuit at a point having the potential of the conductor 154. When the push button 134 is depressed, the plate circuit will remain the same except that the resistor $R_2$ will be shunted across the ammeter and resistors $r_4$ and $r_5$ by circuit through conductor 156, switch points 139 and 140 and conductor 155. At the same time the grid circuit will be connected through switch contact 138 instead of 136 and through conductor 157 to a point between the resistors $r_4$ and $r_5$. It is evident that a value of $R_2$ may be found such that depression of the push button 134 makes no change in the reading of the ammeter 130.

It is obvious that the feature of the preheating sockets may be incorporated in the modification of Fig. 3 simply by connecting the filament contacts of the preheating sockets in parallel with the filament contacts of the socket 66. Furthermore, the use of alternating current may be applied in this modification merely by substituting a transformer of the type shown in Fig. 4 for the batteries $b$, B and $B_2$. In carrying this adaptation into effect it would be necessary to provide a suitable tap intermediate the ends of the winding 132 of the transformer for the purpose of attaching thereto the conductor 92.

Since the operation of this modification in so far as it differs from that of the modification of Fig. 2 has already been indicated, it is believed unnecessary to elaborate the same further.

Having thus described my invention, what I claim is:

1. A device for measuring the mutual conductance of a tube having a cathode, a grid and a plate, said device including a plate circuit including a resistor and a source of current in series, one terminal of said source being connected to said plate, and means for selectively connecting said grid to the other terminal of said source or to a point intermediate the ends of said resistor, said device including means whereby the resistance of said resistor may be varied but only by substantially proportional values on both sides of said point.

2. A device for measuring the mutual conductance of a tube having a cathode, a grid and a plate, said device including a plate circuit including a resistor and a source of current in series, one terminal of said source being connected to said plate, and means for selectively connecting said grid to the other terminal of said source or to a point intermediate the ends of said resistor.

3. A device for measuring the mutual conductance of a tube having a cathode, a grid and a plate, said device including, a plate circuit, mechanism for impressing upon the grid of said tube a potential lower than the potential of said plate, means for changing the potential of said grid and determining the magnitude of such change and the change of plate current resulting therefrom, said plate circuit including a battery having the positive terminal connected to said plate and the negative terminal connected through a resistor and an ammeter to said cathode, said ammeter being connected between said resistor and said cathode.

4. A device for measuring the mutual conductance of a tube having a cathode, a grid and a plate, said device including a plate circuit, mechanism for biasing said grid comprising a connection between said grid and a point in said plate circuit at a lower potential than said plate, means for changing the potential of said grid, and means for determining the value of such change and the change in plate current resulting therefrom, said plate circuit including a battery having the positive terminal connected to said plate and the negative terminal connected through a resistor and an ammeter to said cathode, said ammeter being connected between said resistor and said cathode.

5. A device for measuring the mutual conductance of a tube having a cathode, a grid and a plate, said device including, a plate circuit, mechanism for impressing upon the grid of said tube a potential lower than the potential of said plate, means for changing the potential of said grid and determining the magnitude of such change and the change of plate current resulting therefrom, said plate circuit including a battery having the positive terminal connected to said plate and the negative terminal connected through a resistor and an ammeter to said cathode, said ammeter being connected between said resistor and said cathode, said first means comprising means including a switch for selectively connecting said grid to points in said plate circuit which are at different potentials.

6. A device for measuring the mutual conductance of a tube having a cathode, a grid and a plate, said device including a plate circuit, mechanism for biasing said grid comprising a connection between said grid and a point in said plate circuit at a lower potential than said plate, means for changing the potential of said grid, and means for determining the value of such change and the change in plate current resulting therefrom, said plate circuit including a battery having the positive terminal connected to said plate and the negative terminal connected through a resistor and an ammeter to said cathode, said ammeter being connected between said resistor and said cathode, said first means comprising means including a switch for selectively connecting said grid to points in said plate circuit which are at different potentials.

7. A device for measuring the mutual conductance of a tube having a cathode, a grid and a plate, said device including, a plate circuit, mechanism for impressing upon the grid of said tube a potential lower than the potential of said plate, means for changing the potential of said grid and determining the magnitude of such change and the change of plate current resulting therefrom, said plate circuit including a battery having the positive terminal connected to said plate and the negative terminal connected through a resistor and an ammeter to said cathode, said ammeter being connected between said resistor and said cathode, said second means including a variable resistance shunted around both said ammeter and said resistor when said first means is actuated.

8. A device for measuring the mutual conductance of a tube having a cathode, a grid and a plate, said device including a plate circuit, mechanism for biasing said grid comprising a connection between said grid and a point in said plate circuit at a lower potential than said plate, means for changing the potential of said grid, and means for determining the value of such change and the change in plate current resulting therefrom, said plate circuit including a battery having the positive terminal connected to said plate and the negative terminal connected through a resistor and an ammeter to said cathode, said ammeter being connected between said resistor and said cathode, said second means including a variable resistance shunted around both said ammeter and said resistor when said first means is actuated.

9. A device for measuring the mutual conductance of a tube having a cathode, a grid and a plate, said device including, a plate circuit, mechanism for impressing upon the grid of said tube a potential lower than the potential of said plate, means for changing the potential of said grid and determining the magnitude of such change and the change of plate current resulting therefrom, said plate circuit including a battery having the positive terminal connected to said plate and the negative terminal connected through a resistor and an ammeter to said cathode, said ammeter being connected between said resistor and said cathode, said first means comprising means including a switch for selectively connecting said grid to points in said plate circuit which are at different potentials, said second means including a variable resistance shunted around both said ammeter and said resistor when said first means is actuated.

10. A device for measuring the mutual conductance of a tube having a cathode, a grid and a plate, said device including a plate circuit, mechanism for biasing said grid comprising a connection between said grid and a point in said plate circuit at a lower potential than said plate, means for changing the potential of said grid, and means for determining the value of such change and the change in plate current resulting therefrom, said plate circuit including a battery having the positive terminal connected to said plate and the negative terminal connected through a resistor and an ammeter to said cathode, said ammeter being connected between said resistor and said cathode, said first means comprising means including a switch for selectively connecting said grid to points in said plate circuit which are at different potentials, said second means including a variable resistance shunted around both said ammeter and said resistor when said first means is actuated.

11. A device for measuring the mutual conductance of a tube having a cathode, a grid and a plate, said device including a plate circuit, mechanism for impressing upon the grid of said tube a potential lower than the potential of said plate, means for changing the potential of said grid and determining the magnitude of such change and the change of plate current resulting therefrom, said plate circuit including a battery having the positive terminal connected to said plate and the negative terminal connected through a resistor and an ammeter to said cathode, said ammeter being connected between said resistor and said cathode, said second means including a variable resistance shunted around both said ammeter and said resistor when said first means is actuated, said device including means including a switch whereby when said switch is in one position said grid is connected to said plate circuit at a point having one potential and said variable resistance shunt is broken and when said switch is in another position said grid is connected to said plate circuit at a point having a different potential and said variable resistance shunt is connected.

12. A device for measuring the mutual conductance of a tube having a cathode, a grid and a plate, said device including a plate circuit, mechanism for biasing said grid comprising a connection between said grid and a point in said plate circuit at a lower potential than said plate, means for changing the potential of said grid, and means for determining the value of such change and the change in plate current resulting therefrom, said plate circuit including a battery having the positive terminal connected to said plate and the negative terminal connected through a resistor and an ammeter to said cathode, said ammeter being connected between said resistor and said cathode, said second means including a variable resistance shunted around both said ammeter and said resistor when said first means is actuated, said device including means including a switch whereby when said switch is in one position said grid is connected to said plate circuit at a point having one potential and said variable resistance shunt is broken and when said switch is in another position said grid is connected to said plate circuit at a point having a different potential and said variable resistance shunt is connected.

13. A device for measuring the mutual conductance of a tube having a cathode, a grid and a plate, said device including a plate circuit including a resistor and a battery in series, the positive terminal of said battery being connected to said plate, and means for selectively connecting said grid to the negative terminal of said battery or to the mid-point of said resistor.

14. A device for measuring the mutual conductance of a tube having a cathode, a grid and a plate, said device including a plate circuit including a resistor and a battery in series, the positive terminal of said battery being connected to said plate, and means for selectively connecting said grid to the negative terminal of said battery or to the mid-point of said resistor, said device including means whereby the resistance of said resistor may be varied but only by substantially equal values on both sides of said mid-point.

15. A device for measuring the mutual conductance of a tube having a cathode, a grid and a plate, said device including a plate circuit, mechanism for impressing upon the grid of said tube a potential lower than the potential of said plate, means for changing the potential of said grid and means for determining the magnitude of such change and the change of plate current resulting therefrom, said device also including a socket having contact terminals and a conductor adapted to be attached to a contact on a tube at the end opposite to that cooperating with said socket and means whereby connecting said conductor to said contact always disconnects same from one of said socket terminals.

16. A device for measuring the mutual conductance of a tube having a cathode, a grid and a plate, said device including, a plate circuit, mechanism for impressing upon the grid of said tube a potential lower than the potential of said plate, means for changing the potential of said grid and means for determining the magnitude of such change and the change of plate current resulting therefrom, said device also including a socket having contact terminals and a conductor adapted to be attached to a contact on a tube at the end opposite to that cooperating with said socket and means whereby connecting said conductor to said contact always disconnects same from one of said socket terminals, said last means including a pivoted arm, said conductor being mechanically connected to said arm and of such a length that the arm must be rotated when same is connected to said contact.

17. A device for measuring the mutual conductance of a tube having a cathode, a grid and a plate, said device including, a plate circuit, mechanism for impressing upon the grid of said tube a potential lower than the potential of said plate, means for changing the potential of said grid and means for determining the magnitude of such change and the change of plate current resulting therefrom, said device also including a socket having contact terminals and a conductor adapted to be attached to a contact on a tube at the end opposite to that cooperating with said socket and means whereby connecting said conductor to said contact always disconnects same from one of said socket terminals, said last means including a pivoted arm, said conductor being mechanically connected to said arm and of such a length that the arm must be rotated when same is connected to said contact, said last means further including a switch and means whereby when said conductor is connected to said contact the rotation of said arm will open said switch.

18. In a device for testing tubes, a plate circuit including a source of current, a resistor and an ammeter in series, a grid circuit including means for connecting the grid of a tube selectively to points in said plate circuit at different potentials, a filament circuit including a socket having filament contacts thereon, and a preheating socket having the filament contacts thereof connected in parallel with said filament contacts.

19. A tube testing device including means for measuring the mutual conductance of tubes, said means including a filament circuit, said filament circuit including a pair of filament contacts on a tube socket, and a preheating socket having the filament contacts thereof connected in parallel with said filament contacts.

In testimony whereof, I hereunto affix my signature.

JOB R. BARNHART.